United States Patent Office 3,291,069
Patented Dec. 13, 1966

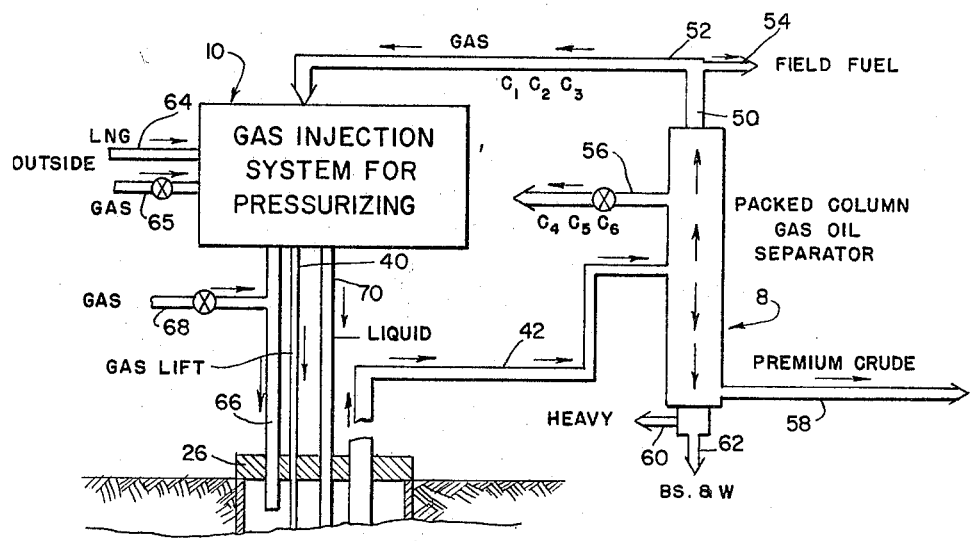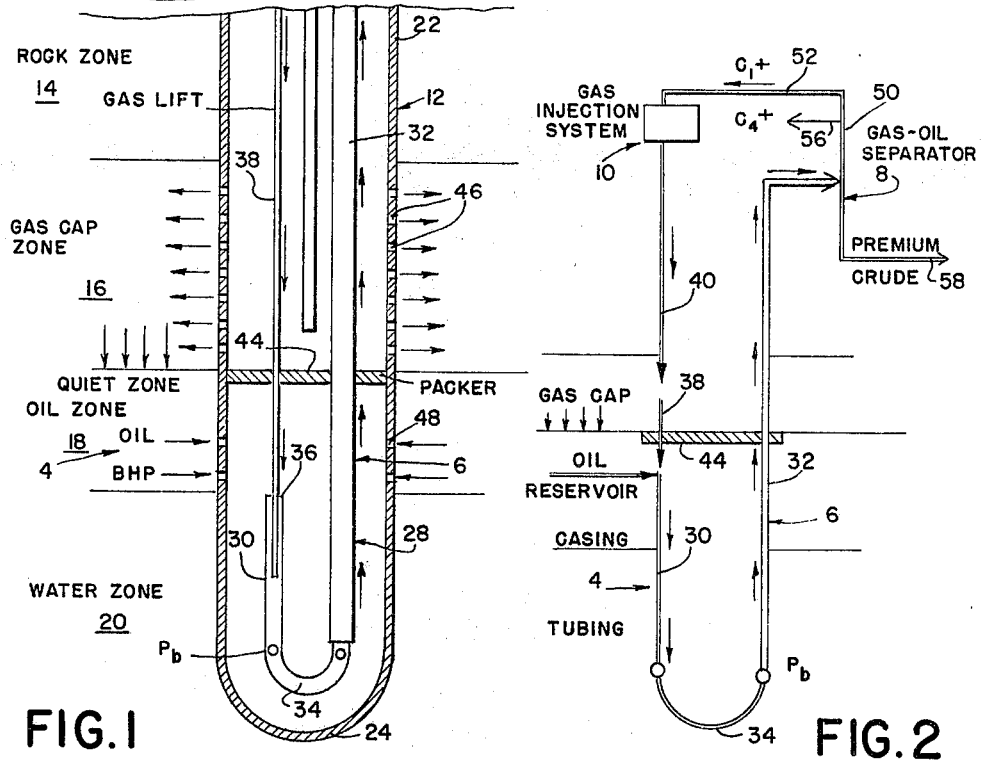

3,291,069
CONTROLLED PVT OIL PRODUCTION
Eduardo Ospina-Racines, Apartado Aéreo 49—45,
Bogotá, Colombia
Filed June 15, 1964, Ser. No. 375,040
8 Claims. (Cl. 103—232)

This invention relates to the production of oil and more specifically to a process and to an apparatus for the production of oil from an underground reservoir under controlled PVT conditions within the well to result in an optimum recovery of oil.

Controlled PVT oil production process is essentially an improved oil well completion technique which will permit the control of oil reservoir pressure P, of flow volume V, and of temperature T and the use of original energy E for utmost oil-field efficiency and oil recovery. The system establishes the control of this parameter in the reservoir proper as against present flow technique of surface control by a choke at the well head.

Controlled PVT oil production process is a fundamental concept in the flow of oil and gas from a pool. Original reservoir energy, namely, heat and gravity, are utilized under control for utmost oil flow advantage by establishing optimum PVT conditions in a hydraulic (graivty) and in a thermodynamic (heat) flow circuit, between the oil and gas reservoir and the surface installations. It complements the material balance concept of flowing oil from a reservoir with an energy balance of the flow circuit. It conserves energy as well as oil and gas. It calls for gas reinjection of all the associated gas and carries this out with a hydrocarbon fluid gas and/or oil injection system at the well site without the use of mechanical compressors or pumps. This will end all gas flaring. The process introduces an economic concept in the flow at the well site to produce a premium crude to meet broad world market specifications by utilizing a packed column as a gas-oil separator and heating the crude oil slightly above reservoir temperature to separate out the $C_1$ and $C_2$ hydrocarbons for the reinjection system. This system replaces the pressure cascade system of separating oil and gas at the field and it is more efficient technically and economically. With controlled PVT, oil will be produced at original and constant reservoir pressure or even carried out at higher pressure if conditions call for it.

Present technique of flowing oil and gas from a pool is one of initial high reservoir pressure with a constant and continuous decline of PVT, which expends the original gas either in solution or in the gas cap, which is never sufficeint to flow all the oil and gas from a pool. Present decline PVT does not exploit sufficient gravity, a universal source of energy. It is a technique of continuous deterioration of flow conditions in the reservoir to the detriment of high oil recovery. Early in the life of a field decline PVT calls for energy injection which means artificial lift and capital investment which can be avoided with controlled PVT. Decline PVT is characterized by low efficiency, high capital investment, waste in the reservoir and gas flaring, all of which sum up as high cost oil.

Controlled PVT produces a premium oil at the field with the conservation of oil, gas and energy at the oilfields with a minimum capital investment; it is low cost oil, hence more profitable than current oil flow. Oil produced by this process in the future will be primary low cost oil. There will be no secondary high cost oil.

Controlled PVT oil production process to flow oil with the utmost oilfield efficiency and oil recovery, which is the equivalent of producing low cost oil, is based on the direct control of the oil and gas reservoir pressure by the operator in the reservoir proper and not at the surface by a wellhead choke as is practiced today.

In the flow of oil in a single liquid phase, control of the pressure results in the control of the rate of flow, or control of volume, according to the well-known Darcy Law. In the flow of natural gas, control of the temperature T results in control of pressure P and volume V, according to the well-known natural gas flow equations and the $PV=nRT$ relation. Controlled PVT is therefore applicable to both oil and natural gas flow by proper control of the several parameters.

Lower cost oil than is produced today can only be obtained if the proposed controlled PVT oil production process results in greater oil reserves and higher recovery of oil in place. This means obtaining greater oil and gas conservation over current oilfield practice. This is attained because original reservoir energy is not utilized, but rather conserved, in flowing the oil to the well bore and tubing. By conserving original reservoir energy, greater conservation of oil and gas follow. Today's oil-field producing practice aims at the material conservation of oil and gas whereas with the proposed system conservation of energy is the uppermost aim. Oil reserves will increase because all future oil produced by controlled PVT process will be primary oil. There will be no secondary high cost oil in the future following this new process. Gas reserves are increased simultaneously because solution gas will remain in the crude in the reservoir while reinjection of associated gas will end all gas flaring hereafter. The increase in oil and gas reserves by conserving energy are two notable results of the proposed oil production process.

Conservation of original reservoir energy is obtained by suppressing the classical drives, namely, gas cap depletion and artificial water drive, by a controllable and more efficient drive. This is accomplished by fundamental measures—by using the universal gravity energy in the reservoir and by the injection of energy into the reservoir from outside sources. Both of these energies will be used to flow the oil from the reservoir to the well bore and up the tubing to the surface. Hereafter the material balance concept in flowing oil must be supplemented, if not replaced, by an energy balance and energy flow concept in producing oil because the material balance is consequent to the energy balance and to its conservation.

It is an object of this invention to provide a novel process and a novel apparatus for oil production which obtains the utmost oilfield efficiency and oil recovery by the direct control of the oil and gas reservoir by the operator in the reservoir proper, rather than at the wellhead choke as is common practice at present.

It is a further object to provide a novel process and a novel apparatus for obtaining greater oil and gas conservation by conserving original reservoir energy.

It is a still further object to provide a novel process and a novel apparatus resulting in the production of a maximum of primary low cost oil, with no or practically no secondary high cost oil.

It is a still further object to provide a novel process and a novel apparatus which overcomes the disadvantages of the presently practiced decline PVT, resulting in a more economical and more efficient production of oil.

It is a still further object to provide a novel process and a novel apparatus which eliminates the present wasteful flaring of gas.

The attainment of the above objects and advantages, as well as additional objects and advantages, will be fully set out in the following specification in conjunction with the accompanying drawings, in which:

FIG. 1 is a diagrammatic illustration of an apparatus according to the invention adapted to carry out the process of the invention; and FIG. 2 is a diagrammatic representation of the primary flow paths.

Referring to the primary flow diagram of FIG. 2, there are depicted: the gas injection at 4, the flow of oil by gas expansion at 6, the packed column gas and oil separator at 8, and the compressorless gas injection system at 10.

The gas injection system 10, corresponds with the thermodynamic ramp system disclosed in the copending application of the present inventor, entitled "Hydrocarbon Gas Compression," Serial No. 235,690, filed November 6, 1962, now abandoned, whose disclosure can be considered as constituting a portion of the present specification.

The gas injection system 10 delivers gas under high delivery pressure to an oil well 12, shown in FIG. 1 as sunk in an oil reservoir having a rock cap zone 14 overlying a gas cap zone 16, which, in turn, overlies an oil zone 18 disposed above a water zone 20.

The oil well 12 includes a casing 22 having a closed bottom 24 and a closure cap 26 through which a number of conduits extend. Within the casing is disposed a gas lift device or tubing comprising a J-tube 28 having a shorter leg 30 and a longer leg 32 interconnected by a 180° bend 34. The shorter leg 30 is open ended and connected with an injector 36 receiving high pressure gas by a gas lift supply duct 38 connected with the outlet 40 from the gas injection system 10. The longer leg 32 of the gas lift device extends through the closure cap 26 and connects with a delivery duct 42 leading to the packed column gas and oil separator section 8.

A packer 44 is disposed within the casing 22 substantially at the level of the oil in the reservoir. The gas lift supply duct 38 and the longer leg 32 pass through openings in the packer. The casing 22 is provided with a series of apertures 46 above the packer 44 communicating with the gas cap, and with a series of apertures 48 below the packer communicating with the oil zone.

The packed column gas and oil separator 8 is a well known type of distillation unit, and is used instead of the presently used conventional oil and gas separating system with a pressure cascade of lower pressures to separate the associated gas from the crude oil. The separator 8 includes an outlet 50 for the $C_1$, $C_2$ and $C_3$ gases having a first branch 52 for reinjection of these gases into the gas injection system 10, and a second branch 54 for delivery to any other desired location in the field. The separator 8 also includes an outlet 56 for $C_4$, $C_5$ and $C_6$ liquids, an outlet 58 for premium crude oil, an outlet 60 for heavier fractions, and a residual outlet 62.

The gas injection system 10 includes an inlet 64 for LNG, an inlet 65 for natural or other hydrocarbon gas, and a connecting line 66 with the casing discharging above the oil level therein, the connecting line 66 joining with a branch 68, for the admission of pressurizing gas. In addition, a liquid line 70 interconnects the injection system 10 with the casing 22, discharging above the oil level therein.

The oil in the oil zone or reservoir 18 may have the following $P_1V_1T_1$ conditions of 86.2° API:

$$P_1 = \text{B.H.P.} = 3400 \text{ p.s.i.a.}$$

$V_1$=FVF x 5.62=8.71 cu. ft.=$4.2n_1$; $T_1$=195° F.; API=86.2°=0.65 sp. gr. The object of the flow of the circuit is to deliver it to a stock tank under $P_0V_0T_0$ conditions at the surface, which results in 38° API of 0.83 specific gravity.

One barrel of oil represents, at the surface, 5.62 cu. ft., whereas in the reservoir it occupies 5.62 x FVF (Formation Volume Factor of 1.55) which results in 8.71 cu. ft., which contains the stock tank oil plus the associated gas dissolved in the original reservoir barrel.

In order to flow the barrel of oil, the outside casing is sealed at the bottom, a technique which is not practiced today, and the packer 44 is installed inside, with the tubings 32 and 38 running through it for gas lift operations. The tubing 38 extends down below the oil pay about 100 feet, the oil pay being about 200 feet for Abqaiq. The shorter leg 30 may have a diameter of one and one-half inches, and the longer leg 32 may have a diameter of three inches. The casing is used for injection of the associated gas, which includes not only the $C_1$ and $C_2$ hydrocarbons but also the non-hydrocarbons such as hydrogen sulfide ($H_2S$) and carbon dioxide ($CO_2$). The perforations 48 permit the oil to flow into the casing and into the shorter leg 30 which acts as a choke for pressure control. The pressure drawdown develops in the casing and not in the oil formation as occurs conventionally, and gas injection at high pressure maintains oil in liquid phase at the bottom of the well.

The conditions at the bottom of the tubing 30–32–34 are: $P_2 = P_b = 2500$ p.s.i.a.; $V_2 = V_1 + = 8.93$ cu. ft.; $T_2 = T_1 = 195°$ F., and the conditions at the well head are: $P^1_2 = 550$ p.s.i.a; $V^1_2 = V_2 +$; and $T^1_2 = 165°$ F. The conditions in the outgoing gas from the gas injection system are: $P_4 = 4650$ p.s.i.a.; $V_4 = V_3 = 2.5n_3$; and $T_4 = T_1 = 195°$ F. to 225° F.; and the conditions in the packed column are: $P_3 = 500$ p.s.i.a.; $V_3 =$ GOR $= 950$ cu. ft./b.$= 2.5n_3$; and $T_3 = T^1_2 + 100°$ F. $= 265°$ F.; and in the stock tank: $P_0 = 1$ atmosphere; $V_0 = 1$ barrel, 5.6 cu. ft.; $T_0 = 60°$ F.; and API=38°=0.83 sp. gr.

Gas injection at $T_4$ will heat the tubing 32 and thereby promote isothermal flow, which is more efficient than adiabatic non-steady flow as practiced currently.

The packed column is a well known distillation unit. Instead of lowering the gas pressure further from 500 p.s.i.a. to 250, 50 and 14.7 p.s.i.a., as is done in conventional oil-gas separators with a pressure cascade of lower pressures to separate the gas from the crude oil, the present invention heats the crude oil flowing into it 100° above its entry temperature for separation, resulting in more efficient practice.

The flow of the oil and its PVT control develops thus: reservoir oil under $P_1V_1T_1$ conditions indicated above flows into the casing and down into the tubing 30, using two sources of energy, namely, $P_1V - P_2V_2$, replaced by $P_4V_4 - P_1V_1$, which is external and gravity or $g/gc$ X, which is also an external source of energy, always available universally in time and quantity. The leg 30 is lower than the bottom of the oil pay, for illustrative purposes, 100 feet, where the oil pay is 200 feet. The additional depth of the tubing 30 below the oil pay, hence of the casing, can be equated to the $P_1$ and $P_2$ pressures prevailing thus:

$$P_1 - P_b = F \frac{v^2 L}{g D_1}$$

which is a well known hydraulics equation. For the conditions shown it works out at $P_1 - P_b = 900$ p.s.i.a.$= 3200$ ft. for 0.65 sp. gr. crude. All of the factors are known except F, the friction-dimension factor, and L, which is the depth below the oil pay. In general $D_1$ will work out from 1% to 3% of the well depth and must be established experimentally for most efficient flow. Tubing 30 may be 1½" diameter while tubing 32 may be 3" diameter. The smaller diameter tubing results in a high velocity flow and the 3400 p.s.i.a. B.H.P. when static drops to 2500 p.s.i.a. or bubble point at 100 feet below the oil pay in the tubing. Gas in solution starts coming out and it is the recommended point for the 180° bend and the larger diameter tubing 32 to flow the oil by gas expansion to the surface.

The PVT originally in the oil reservoir are now $P_2V_2T_2$ in the tubing 30–32–34 and casing 22, by suitable design of the choke in the tubing as described. By injection of gas through the tubing 38 to saturation conditions, $P_1V_1T_1$ can be established at the bottom of the tubing 32 for higher rate of flow. $P_b = 2500$ p.s.i.a. will then become 3400 p.s.i.a. at the bottom of tubing 32.

The oil flows upwardly to the surface in the leg 32. The energy used is the gas expansion $(P_2V_2-P^1{}_2V^1{}_2)$ and also some gravity kinetic energy. As may be seen, $P_2=2500$ p.s.i.a. and $P^1{}_2=550$ p.s.i.a. resulting from the gas expansion. This energy should be used only the tubing 32 and not in the reservoir. Present decline PVT practice uses this gas expansion energy in the reservoir and this is the reason for obtaining such low yields of 10% of oil in place and maximum 20%. This control of the type of energy used in the circuit to make the oil flow is essentially controlled PVT technique. As may be appreciated, the barrel of crude in the reservoir remains in liquid phase from the reservoir to the bottom of the shorter leg 30, whereas in the leg 32 a two phase flow develops. Two phase flow should not develop in the reservoir for utmost oilfield efficiency, but only in the longer leg 32 to the surface.

The crude two phase flow enters the packed column which is heated externally by suitable means and is a well known unit process in the refinery industry. It is used for separating the oil and associated gas. With the present system the first separator is at 500 p.s.i.a pressure and subsequent ones operate at 250 and 50 p.s.i.a., and one atmosphere or 14.7 p.s.i.a. With the packed column the oil flow is heated 100° F. above the incoming 165° F. and it will drive out all and more gas than the 950 cu. ft./b. and at 500 p.s.i.a. obtained by the present pressure cascade system. Bottoms of the packed column is premium crude, at $P_0V_0T_0$ conditions. The reservoir crude can be tailored to broad world market specifications, removing the associated gas and more of it per barrel and in addition the light fractions or light gasoline fraction of the crude which may amount to 10% and will increase the price of the crude. The light fractions can be reinjected into the production formations for storage. These are the $C_4$, $C_5$ and $C_6$ hydrocarbons in liquid phase indicated. These can be injected into the producing formations either by shaft pump work or with an injector, preferably the latter to avoid moving elements and parts in the field.

The light $C_1$ and $C_2$ hydrocarbons, and some $C_3$ hydrocarbons, are taken off the packed column by suitable reflux cooling operation and delivered at 500 p.s.i.a. to the gas injection system. In present conventional oil and gas separation method, some of the gas is available at 500 p.s.i.a. while about 40% may be below this pressure. Only the 500 p.s.i.a. gas is reinjected in Abqaiq Saudi Arabia while the other low pressure gas is flared and wasted. With the packed column all the gas is available at high pressure or 500 p.s.i.a. and therefore utilized and conserved.

The gas reinjection system, described in U.S. application Serial No. 235,690, filed November 6, 1962, now abandoned, consists essentially in taking the 500 p.s.i.a. gas from the packed column, cooling it, liquefying it and vaporizing it at 195° F. resulting in the $P_4V_4T_4$ conditions indicated above. The gas flows back into the gas cap by virtue of the $P_4V_4-P_1V_1$ energy. The $P_4$ developed, of 4650 p.s.i.a., is proportional to the moles available from the packed column per barrel, indicated as $2.5n_3$, also to the compressibility factor $z$ which is taken as unity for the 3400 p.s.i.a. pressure. The energy utilized in making the gas flow is essentially heat, and not produced by compressors as in current practice.

The flow circuit and type of energy used have been described. The essential idea and fundamental one is that in moving one barrel of reservoir crude from the reservoir to the surface a certain amount of energy is expended. Such energy must not come from the reservoir which results in gas cap expansion and/or gas in solution expansion. The energy for the flow of the reservoir crude from the reservoir to the $P_b$ in the tubing 30 flowing in liquid phase must come from outside sources, that is, heat and gravity. Energy for the flow of the crude from $P_b$ to the surface is obtained from gas in solution expansion, plus gas lift provided by internal and external sources. The fundamental conclusion is that the gas injection system must inject an equal amount of energy as is being expended in the operation of flowing the oil to the surface in the form of heat to equal the energy being expended in the flow. This means that $$E_1=P_4V_4=nRT_4$$

The original energy $E_1$ which is removed in the flow from the reservoir fluid to the well bore must be replaced by the gas injection energy. When this is carried out, the maximum amount of oil will flow from the reservoir at constant $P_1V_1T_1$ to establish the maximum oil and gas conservation, and maximum efficiency of flow. Today, with decline PVT, internal energy is expended to the detriment of high oil recovery and from 10% to 20% of oil in place is obtained while by injecting energy with water pressure maintenance, such recovery may go much higher. The reason this percentage is not higher is because the same amount of energy is not being reinjected as being expended. Artificial water drive has limitations of pressure while gas injection by vaporizing the liquid natural gas can develop pressures of 10,000 p.s.i.a. at only 268° F. Oil will be produced by this method at original and constant reservoir pressure which sometimes is not technically nor economically possible with current pressure maintenance system particularly when original reservoir pressures are higher than 2500 p.s.i.a. B.H.P. can also be increased by first vaporizing LNG and fields depleted of energy and gas can be revived. A vaporizer requiring no moving parts is described in a copending application filed by the present inventor on February 16, 1962, Serial No. 174,372.

The first injection of outside energy is by raising the B.H.P. by injecting natural gas into the gas cap to a predetermined level above original B.H.P. This may be carried out by vaporizing LNG in a gas injection system previously referred to, which uses no compressor. The amount of LNG injection depends on the permeability of the reservoir and rate of flow desired by the operator. The additional investment of raising B.H.P. is covered by greater oil flow. B.H.P. may be raised some 1,000 to 3,000 p.s.i.a. over the original B.H.P., to the 4,000 to 7,000 p.s.i.a. range, without use of mechanical compressors.

According to the Darcy expression, for a homogeneous fluid, the rate of flow in the reservoir to the well bore is a direct function of the permeability of the medium and of the differential pressure developing. The higher B.H.P. will result in a more undersaturated, hence more homogeneous, fluid of lower viscosity and the oil may be flowed in the reservoir at will. The classical drives, depletion and gas cap drives, will be suppressed by the higher B.H.P. Reinjection of gas maintains B.H.P. constant. A greater flow efficiency results, comparable to other high P and T thermodynamic systems, such as the steam boiler, and internal combustion high compression ratio engines.

Reinjection of all of the associated gas will permit production of oil at constant reservoir pressure. If insufficient, natural gas from other sources may be injected, brought in either as gas or as LNG. This will end all gas flaring at the field. The reinjection of gas, while producing oil, does two things: (1) injects energy which is utilized to flow the oil, and (2) maintains the B.H.P. constant, while flowing. These two operations represent a combined energy plus material balance systems.

Wells to develop an oilfield will be either single, or arranged in five or seven spot pattern. The gas injection wells will be perforated at the gas cap level. The flowing oil well will be perforated at the oil pay level. The casing will extend in depth below the oil pay and will be sealed at the bottom as by geologic formations or by suitable casing design. For wells used simultaneously to flow the oil and to reinject the gas, depending on the characteristics of the reservoir formation, a packer is located at the gas-oil level inside the casing. For wells injecting gas only, no packer is required.

The additional well depth and of the casing permits establishing a differential pressure when the oil flows in the tubing to the surface=$P_1-P_b$ or B.H.P. and the bubble point of the crude, which becomes the drawdown pressure and develops in the casing and not in the oil reservoir which is detrimental to the flow efficiency. This pressure drawdown is controllable, and hence is the rate of oil flow.

This flow design permits the use of gravity energy to complement the energy of gas reinjection to flow the oil to the well bore and tubing. Gravity which is universal in quantity and time is not fully exploited with today's oil flow technique.

Having fully described my invention, it is to be understood that I do not wish to be limited to the details herein set forth but that my invention is of the full scope of the appended claims.

I claim:
1. A system for oil recovery from a reservoir having a gas cap, comprising: a casing closed at the bottom and having a packer substantially at the gas-oil level, the casing including perforations above and below said packer communicating with the gas zone and oil zone above and below said packer, a gas lift device within said casing including an open ended J-tube having its shorter leg open to the oil within the casing and its longer leg extending without the casing; gas pressurizing means having an inlet and an outlet; a tubing connecting the outlet of said means with the open end of the shorter leg of said J-tube; a packed column gas and oil separator connected with the longer leg of said J-tube; and means to deliver separated gases from said separator to said pressurizing means.

2. A system for oil recovery according to claim 1, in which said pressurizing means is of the gas injection type.

3. A gas lift well for an underground reservoir having an oil zone and an overlying gas cap under pressure, comprising: a casing having a closed bottom, a packer within said casing disposed substantially at the gas-oil level, said casing having perforations above and below said packer communicating with the gas and oil in the reservoir, respectively; an open ended J-tube within said casing, the open end of the shorter leg disposed within the oil in said casing and the longer leg extending outside the casing to a point of discharge, and an injector cooperating with the open end of said shorter leg.

4. A gas lift well according to claim 3, in which the longer leg has a diameter considerably greater than the shorter leg.

5. A gas lift well according to claim 3 wherein said injector comprises a gas injection tube extending into the open end of said shorter leg.

6. A gas lift well according to claim 3 wherein said injector comprises a gas injection tube of smaller diameter than said shorter leg extending into said shorter leg.

7. A gas lift well according to claim 3 wherein a gas injection tube extends into the open end of said shorter leg to serve as a choke.

8. A gas lift well according to claim 3 wherein a gas injection tube extends into the open end of said shorter leg below the gas-oil level a distance which is a function of gas cap pressure.

References Cited by the Examiner
UNITED STATES PATENTS

| | | | |
|---|---|---|---|
| 1,737,894 | 12/1929 | Reynolds | 103—232 |
| 1,796,788 | 3/1931 | Hill | 103—232 |
| 2,275,947 | 3/1942 | Courtney | 103—232 |
| 2,441,084 | 5/1948 | Scattergood | 103—232 |
| 2,892,414 | 6/1959 | Griffith | 103—232 |
| 3,078,809 | 2/1963 | Wahefield | 103—232 |

FOREIGN PATENTS 234,878  5/1909  Germany.

MARK NEWMAN, *Primary Examiner.*

W. J. KRAUSS, *Assistant Examiner.*